United States Patent [19]

Kallenbach

[11] Patent Number: 5,100,541
[45] Date of Patent: Mar. 31, 1992

[54] IN-LINE DEBRIS TRAP FOR SWIMMING POOL FILTRATION SYSTEM

[75] Inventor: Dieter H. F. Kallenbach, Transvaal Province, South Africa

[73] Assignee: Zarina Holding C.V., Amsterdam, Netherlands

[21] Appl. No.: 502,041

[22] Filed: Mar. 30, 1990

[30] Foreign Application Priority Data

| Mar. 31, 1989 [ZA] | South Africa | 89/2391 |
| Aug. 31, 1989 [ZA] | South Africa | 89/6665 |
| Sep. 29, 1989 [ZA] | South Africa | 89/7420 |

[51] Int. Cl.[5] ............................ B01D 35/02
[52] U.S. Cl. ..................... 210/94; 210/130; 210/169; 210/446; 210/448; 210/450; 210/499; 15/1.7; 4/490
[58] Field of Search .............. 277/205; 210/446, 450, 210/169, 84, 448, 130; 4/490; 15/1.7

[56] References Cited

U.S. PATENT DOCUMENTS

| 2,418,247 | 4/1947 | Dalzell | 210/448 |
| 2,793,752 | 5/1957 | Jay | 210/448 |
| 3,132,364 | 5/1964 | Oxley | 15/1.7 |
| 3,310,173 | 3/1967 | Sosower | 210/448 |
| 3,370,711 | 2/1968 | Hitzelberger et al. | 210/448 |
| 3,902,746 | 9/1975 | Brandt | 210/448 |
| 4,149,974 | 4/1979 | Bolton et al. | 210/448 |
| 4,161,320 | 6/1979 | Stucke | 277/205 |
| 4,244,192 | 1/1981 | Chellis | 277/205 |
| 4,356,791 | 11/1982 | Ward et al. | 210/448 |
| 4,718,129 | 12/1988 | Miller | 210/169 |
| 4,725,352 | 2/1988 | Haliotis | 210/169 |
| 4,826,591 | 5/1989 | Macia | 210/169 |
| 4,988,437 | 1/1991 | Gefter et al. | 210/416.2 |

OTHER PUBLICATIONS

Sethro Filter Co. flyer, 2284 Babylon Turnpike, Merrick, NY (May 1961).

Primary Examiner—Stanley S. Silverman
Assistant Examiner—Robert James Popovics
Attorney, Agent, or Firm—Kilpatrick & Cody

[57] ABSTRACT

This invention is concerned with the sealing of component parts of equipment providing a path for liquid therethrough under reduced pressure and to the inclusion of a lip seal between the components with the lips directed outwardly of the joint between the components. More particularly the invention is concerned with the use of lip seals referred to in debris traps included in domestic swimming pool filtration equipment.

5 Claims, 3 Drawing Sheets

IN-LINE DEBRIS TRAP FOR SWIMMING POOL FILTRATION SYSTEM

FIELD OF THE INVENTION

This invention relates to seals which may be used to prevent ingress of outside atmosphere through closure assemblies in equipment designed to operate at reduced pressures.

BACKGROUND OF THE INVENTION

Equipment such as suction pumps and the like which are subjected to sub atmospheric conditions during use include seal assemblies for closure members. These seals are in general o-ring type seals which must be compressed by the closure member to effect sealing.

This is particularly prevalent in pump assemblies that are very widely used for domestic swimming pool filtration plants.

Seals of this nature, where closure members are frequently removed to provide access to the interior of the pump or other equipment become damaged and ineffective. This often seriously impairs the efficiency of the equipment.

Also widely used in domestic swimming pool installations are debris traps which also require sealing between closure members and the body of the traps. Debris traps of the above kind are well known and are used to prevent large and heavy debris from being passed through the pump to pollute the filter for the swimming pool water. Their use also enables such debris to be more readily removed from the system than can be done through clearing of the usual leaf trap baskets in the pool weir and filter pump unit.

The debris traps are simple but sealing in a simple manner has not been accomplished and this has resulted in articles which require accurate manufacture or which tend to leak and reduce the effectiveness of the pool cleaning operation.

It is the object of this invention to provide a sealing assembly for articles of the above type which is simple and effective.

SUMMARY OF THE INVENTION

According to this invention there is provided equipment subject to reduced pressure during use having a closure member with a lip seal retained between the closure member and the adjacent part of the equipment with the lips directed outwardly of the equipment.

The invention also provides for the equipment to be swimming pool filtration pumps and in-line debris traps with the seal retained in a peripheral groove in one component of the trap to contact the wall of an engaging second component of the trap.

Where the trap is an in-line trap to be positioned in the flexible suction hose for the swimming pool filtration the trap will comprise a hollow body with inlet and outlet openings at each end shaped for connection into a suction hose, one end having a spigot insertable into the body and having a peripheral groove, housing a lip seal therein with the lip facing outwardly.

Still further features of this invention provide the trap to include a perforated basket in the body spaced apart from the wall of the body and with the bottom of the basket adjacent the outlet end of the body and for the basket to be fitted in the body to ensure that the main flow path for water through the trap in use is through the basket.

The invention also provides for the bottom of the basket to locate in the body against resilient stops.

BRIEF DESCRIPTION OF THE INVENTION

Preferred embodiments of the invention will be described below with reference to the accompanying drawings in which FIG. 1 is a part sectional view of a debris trap including a reduced pressure seal, FIG. 2 a similar view to FIG. 1 including a perforated basket in the trap and FIG. 3 is a part sectional view of the seal in a pump debris trap, with FIG. 3A being an enlarged view of a portion of FIG. 3.

DETAILED DESCRIPTION OF THE DRAWINGS

Figure 1:
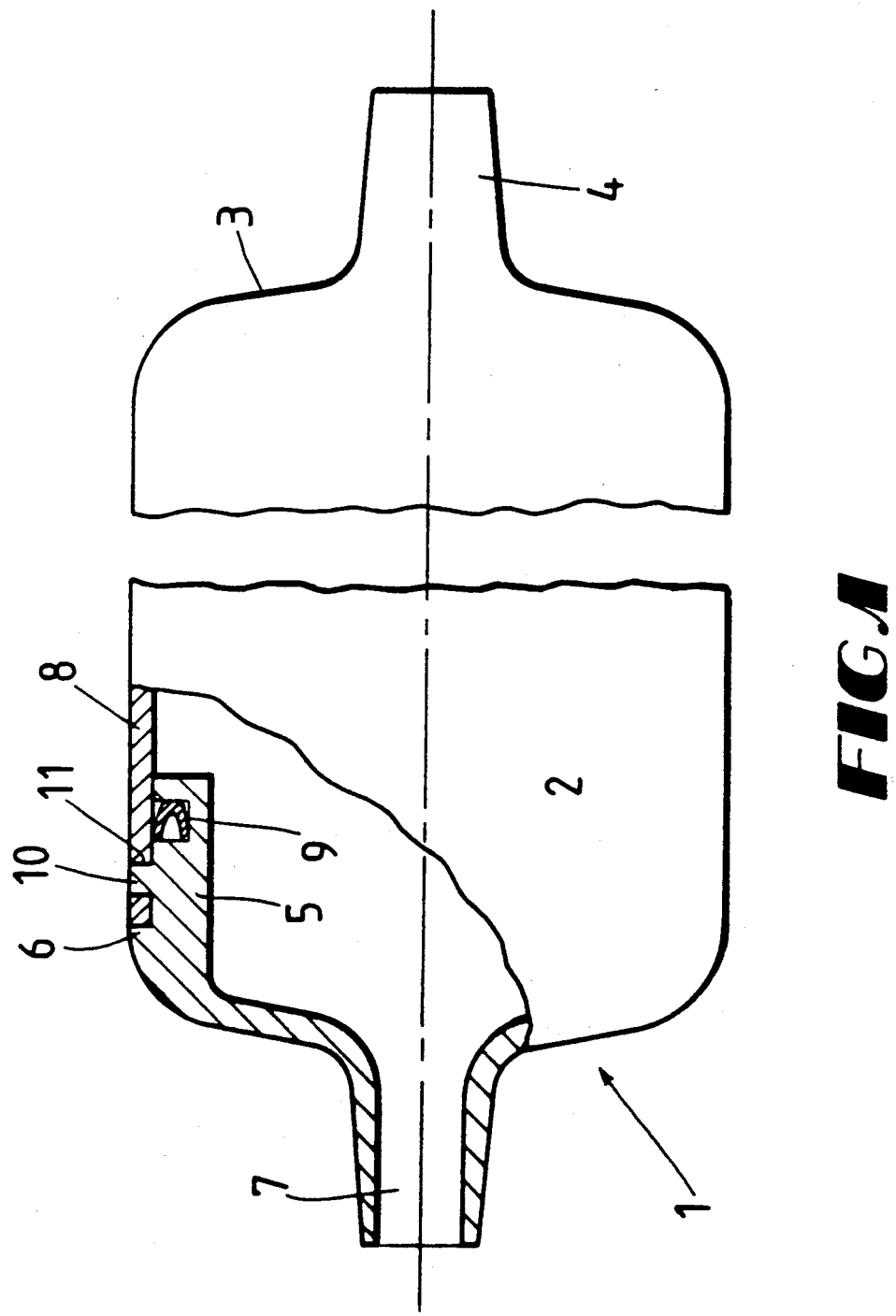

Referring to FIG. 1 the debris trap 1 consists of a hollow circular cylindrical body 2 having one end 3 closed and provided with an axial outlet in the form of a hollow spigot 4 suitable for insertion into a coupling member of a swimming pool filter suction hose. The body is made from suitable plastics material.

The other end of the body 2 is formed as a spigot 5 which fits into the end of the body 2 and carries a radially outwardly extending peripheral flange 6 which locates against the end of the wall of the body 2.

The spigot 5 has a similar hollow axial inlet opening 7 to that described as the outlet from the body.

The spigot 5 has a peripheral groove 8 formed in the wall thereof and the groove 8 houses a flexible lip seal 9. The lips of the seal 9 face the flange 6.

A pintle 10 is provided at one part of the periphery of spigot 5 and this co-operates with a bayonet-type joint slot 11 to enable the spigot 5 to be retained in the end of the body 2. The spigot 5 is made to a size so that the seal 9 will lightly frictionally engage against the inner surface of the wall of the body.

Thus the spigot 5 forms a removable end to the assembly and is inserted into the body with the pintle 10 engaging in the slot 11 and twisted through a small angle to retain it in position.

In use the trap is simply connected into the suction hose for the pool cleaner. When the filter unit is operating large and heavy debris passing through the hose will fall to the lower level of the trap because of the reduced flow velocity through the trap. The suction will result in external pressure opening the lip seal to seal the removable end in the body.

Figure 2:
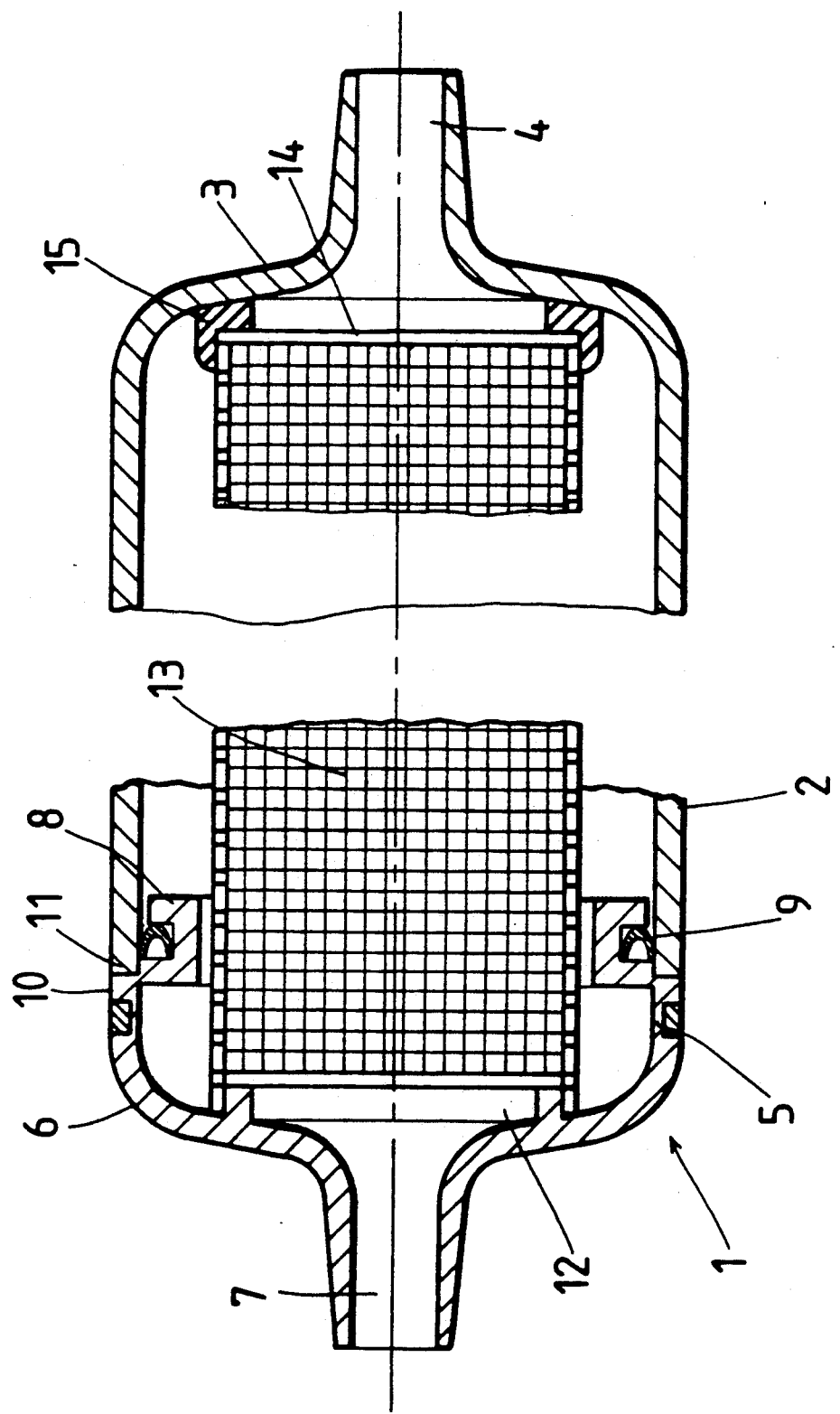

FIG. 2 illustrates the trap of FIG. 1 including an additional component.

The inlet end of the trap has an inwardly directed circular flange 12 projecting co-axially into the body and spaced a predetermined distance inwardly of the longitudinal wall of the body.

A basket 13 of plastics material is provided and the side wall and bottom 14 of the basket are perforated to provide a coarse filter or screen for water passing therethrough.

At the outlet end of the body spaced resilient stops 15 are provided and arranged so that when the basket 13 is located in the body with the bottom 14 on the stops 15 the open end of the basket will be located around the flange 12 and in substantial contact with the inside of the inlet end to the body.

The stops 15 are also such that they will locate the basket centrally in the body.

The perforations are made such that the openings through each consecutive 10 per cent of the length of the basket is greater than the inlet or outlet openings to the body.

In use the trap is located in the length of the flexible hose leading from the surface of a swimming pool to a pool filter for cleaning that surface. Debris entrained in the water flow to the filter will be retained in the body of the trap. As the volume of this debris increases the basket will become filled therewith and the level of collection of debris in the basket will be clearly visible from outside.

This will enable a person to decide when the trap is to be emptied.

Should the trap not be emptied at an appropriate time, the basket will become full and flow through the trap seriously impeded. At such a stage the suction acting through the trap will pull the basket against the resilient stops 15 to release the open end of the basket from the inlet end of the body and create a flow path for unfiltered water through the body between the outer wall of the basket and inner wall of the body.

This will prevent a choked basket from causing a serious restriction in flow to the filter and possibly serious damage to the filter pump.

When the basket is cleared and replaced the stops 15 will re-locate the basket for proper normal filtering operation.

The use of the debris trap will protect the weir and pump traps from choking and is more readily cleared than the other traps.

Alternatively the open end of the basket need not seat firmly against the flange 12 but clearance space may be provided at all time for a by-pass flow outside the basket. Flow through this by-pass will only take place when there is a severe restriction to flow through the perforations in the bottom and walls of the basket.

Figure 3:
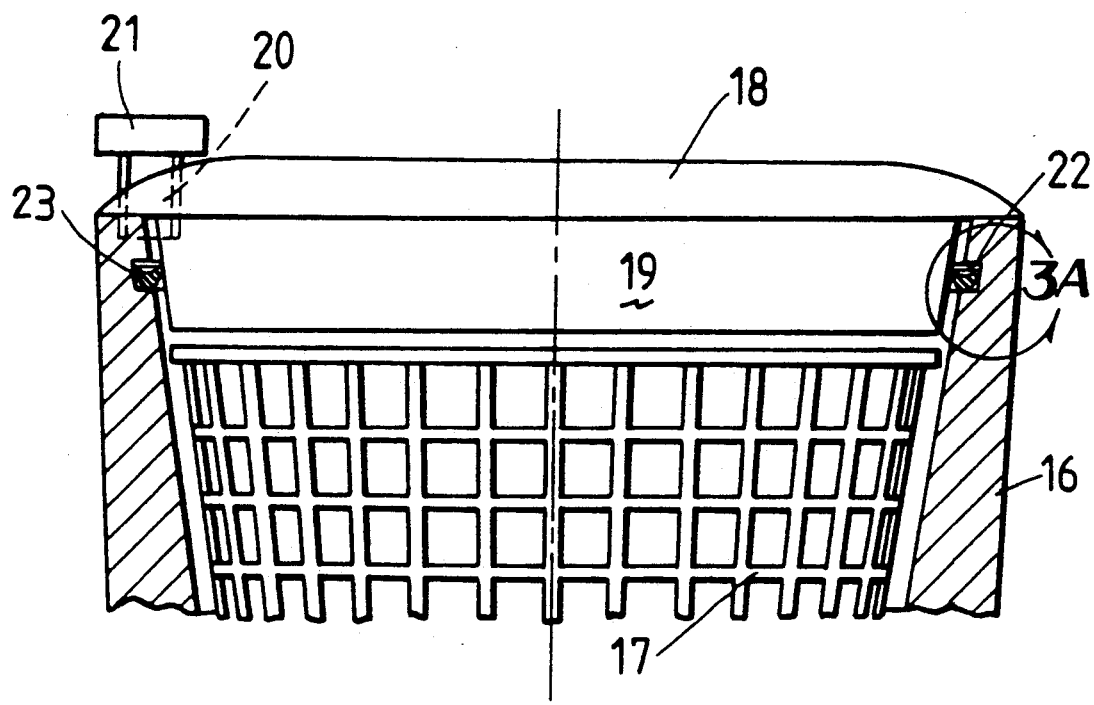
Figure 3A:
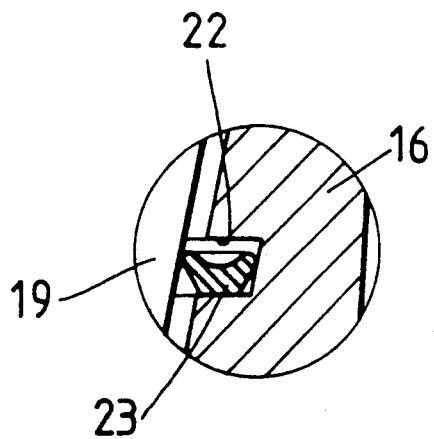

The invention as applied to the leaf trap assembly of a domestic swimming pool filtration pump is illustrated in FIG. 3.

As shown the housing 16 for a leaf trap 17 is fitted with a closure member 18. This member 18 has a spigot 19 which projects into the housing 16.

Studs 20 secured in the wall of the housing 16 extend through holes provided in the closure member 18 so that the latter can be secured against the housing 16 by means of suitable manually rotateable nuts 21.

A peripheral groove 22 is provided in the wall of the housing adjacent to the spigot 19 on the closure member. In this groove 22 is located a lip seal 23. The lips of seal 23 are directed outwardly towards the opening in the housing 16 as indicated in the detail of the drawing.

In use, as soon as reduced pressure is applied within the housing 16, the lips of seal 23 spread into effective sealing engagement between the wall of the groove 22 and the spigot 19 on the closure member. No other force is required to effect sealing and the closure member need not be firmly secured as is necessary where O-ring type seals are used.

What we claim as new and desire to secure by Letters Patent is:

1. A swimming pool filtration system in-line debris trap comprising:
    a) a hollow, cylindrical body having a wall defining an interior, an open end and an outlet end;
    b) a spigot having an interior, an inlet, an outer flange insertable into the open end of the body and a peripheral groove in the outer flange;
    c) a lip seal positioned in the peripheral groove and having a lip which projects radially from the groove and frictionally contacts the body; and
    d) a screening means contained within the body;
    e) a circular flange seated on the interior of the spigot that frictionally contacts the top of the screening means to prevent the flow of water from by-passing the screening means;
    f) a plurality of resilient stops on the interior of the body that frictionally contact the bottom of the screening means and are compressed by suction acting against the screening means when water flow through the screening means is impeded.

2. The in-line debris trap of claim 1 wherein the body is made of transparent plastic.

3. The in-line debris trap of claim 1 wherein the screening means comprises a perforated basket having a top and a bottom and the basket is spaced apart from the wall and adjacent to the outlet end.

4. The in-line debris trap of claim 3 further comprising a means for a flow of water through the debris trap to by-pass the perforated basket.

5. A swimming pool filtration system in-line debris trap comprising:
    a) a hollow, substantially cylindrical body made of transparent plastic and having a wall defining an interior, a plurality of resilient stops, an open end and an outlet end;
    b) a spigot having an interior, an inlet, an outer flange insertable into the body, a peripheral groove in the outer flange and a circular flange in the interior of the spigot;
    c) a lip seal seated in the peripheral groove having a lip which projects radially from the groove and frictionally contacts the interior of the body; and
    d) a screen within the body comprising a basket spaced apart from the wall and adjacent to the outlet end having a top that frictionally contacts the circular flange, a bottom that frictionally contacts the resilient stops, a main flow passage through the basket and a by-pass flow passage between the basket and the wall.

* * * * *